(12) United States Patent
Kriese et al.

(10) Patent No.: US 8,584,792 B2
(45) Date of Patent: Nov. 19, 2013

(54) DOOR MODULE HAVING AN ACOUSTIC UNCOUPLING MEANS

(75) Inventors: Olaf Kriese, Coburg (DE); Joachim Müller, Werneck (DE); Markus Schultz, Nuremberg (DE); Werner Stammberger, Grub am Forst (DE)

(73) Assignee: Brose Fahrzeugteile GmbH & Co. KG, Hallstadt, Hallstadt (DE)

( * ) Notice: Subject to any disclaimer, the term of this patent is extended or adjusted under 35 U.S.C. 154(b) by 0 days.

(21) Appl. No.: 13/576,647

(22) PCT Filed: Jan. 25, 2011

(86) PCT No.: PCT/EP2011/050961
§ 371 (c)(1),
(2), (4) Date: Aug. 1, 2012

(87) PCT Pub. No.: WO2011/095415
PCT Pub. Date: Aug. 11, 2011

(65) Prior Publication Data
US 2012/0292125 A1    Nov. 22, 2012

(30) Foreign Application Priority Data
Feb. 4, 2010 (DE) .................. 20 2010 002 222 U

(51) Int. Cl.
*F16F 7/00* (2006.01)

(52) U.S. Cl.
USPC ............................................. 181/207; 49/502

(58) Field of Classification Search
USPC ............................................. 181/207; 49/502
See application file for complete search history.

(56) References Cited

U.S. PATENT DOCUMENTS 5,111,620 A * 5/1992 Lau et al. ................... 49/502
6,141,910 A * 11/2000 Kobrehel et al. ........... 49/378
(Continued)

FOREIGN PATENT DOCUMENTS

| DE | 195 28 467 A1 | 2/1997 |
|----|---------------|--------|
| DE | 10 2006 007 679 A1 | 8/2007 |
| DE | 10 2008 048 236 A1 | 4/2009 |
| EP | 0 847 127 A1 | 6/1998 |

OTHER PUBLICATIONS

English translation of the International Preliminary Report on Patentability, corresponding to PCT/EP2011/050961, dated Aug. 7, 2012, 7 pages.

(Continued)

*Primary Examiner* — Forrest M Phillips
(74) *Attorney, Agent, or Firm* — Christie, Parker & Hale, LLP

(57) ABSTRACT

A door module of a vehicle door is provided. The door module comprising a carrier plate, a drive unit arranged on the carrier plate for driving a power-operated adjustment device of the door module, and a decoupling means arranged on the carrier plate for attenuating an acoustic excitation of the carrier plate in operation of the drive unit. The decoupling means is formed by at least one slot, which partly separates a portion carrying the drive unit from another portion of the carrier plate and extends around the drive unit or around a fastening point of the drive unit on the carrier plate in a circumferential direction, and at least one web, which connects the portion carrying the drive unit with the other portion of the carrier plate.

10 Claims, 6 Drawing Sheets

(56) References Cited

U.S. PATENT DOCUMENTS

| | | | |
|---|---|---|---|
| 7,198,319 B2 * | 4/2007 | Schroder et al. | 296/146.7 |
| 7,810,281 B2 * | 10/2010 | Warren et al. | 49/349 |
| 2009/0077896 A1 | 3/2009 | Warren, Jr. et al. | |

OTHER PUBLICATIONS

International Search Report of corresponding PCT/EP2011/050961, dated Jun. 21, 2011, 4 pages.

* cited by examiner

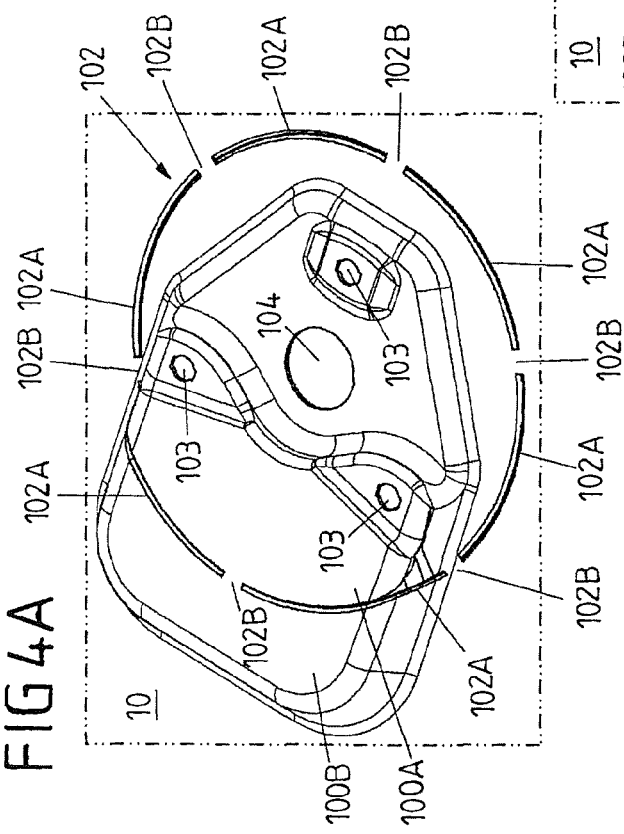
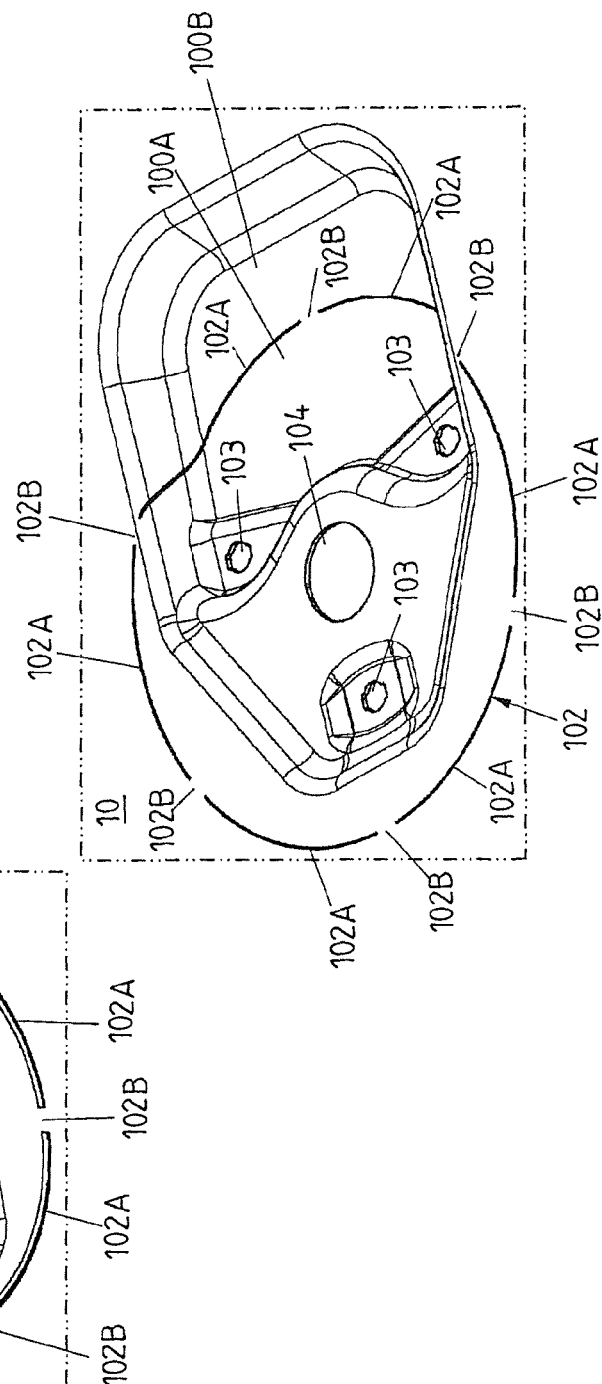

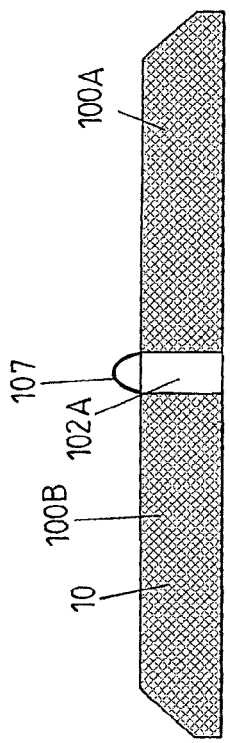
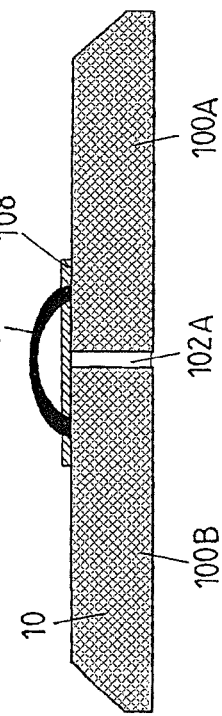
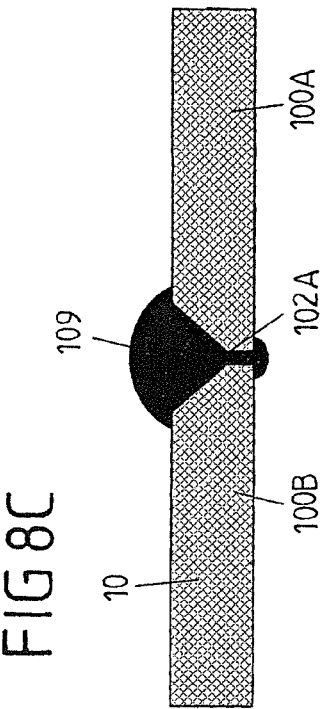
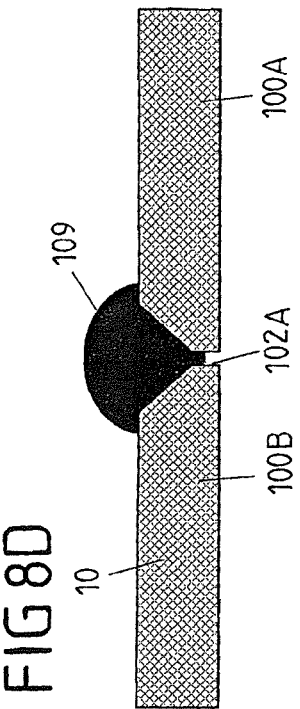
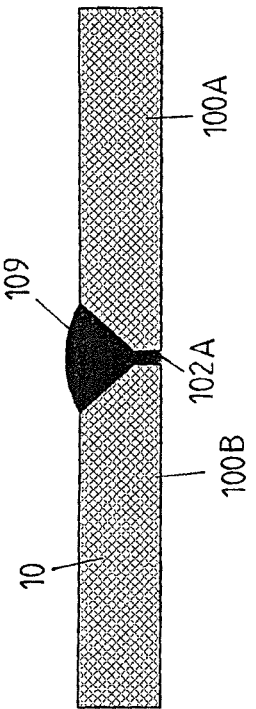

DOOR MODULE HAVING AN ACOUSTIC UNCOUPLING MEANS

CROSS-REFERENCE TO A RELATED APPLICATION

This application is a National Phase Patent Application of International Patent Application Number PCT/EP2011/050961, filed on Jan. 25, 2011, which claims priority of German Utility Model Application Number 20 2010 002 222.3, filed on Feb. 4, 2010.

BACKGROUND

This invention relates to a door module of a vehicle door.

Such door module includes a carrier plate and a drive unit arranged on the carrier plate for driving a power-operated adjustment device of the door module. The carrier plate can constitute an integrated assembly carrier for carrying different functional components of a vehicle door, for example a window lifter unit, a door lock, a loudspeaker or other functional components of the vehicle door. The drive unit for example serves for driving the window lifter and for this purpose for example includes an electric motor for the motorized drive of a window pane guided along guide rails.

A carrier plate of such door module extends in a planar manner and for mounting the door module on a vehicle door for example is connected with a door inner panel of the vehicle door. Nowadays, the carrier plate generally is formed of plastics and carries the drive unit connected via one or more fastening points.

In operation of the drive unit, components, for example movable parts of the electric motor or driven transmission parts, necessarily are set in motion. These movements of the drive unit or its components are also introduced into the carrier plate as vibrations via the coupling fastening points and excite the carrier plate to vibrate. As a result of this excitation, sound waves (also referred to as structure-borne sound) are generated, which can be perceived in the vehicle interior and, when the frequency range of the excitation vibrations overlaps with the natural resonance frequencies of the vehicle door arrangement, can even be amplified and possibly lead to a disturbing vibration and rattling.

In such door modules it is desirable to inhibit or at least reduce a sound generation and a sound propagation at least to such an extent that it is no longer perceived as disturbing for a vehicle occupant in the vehicle.

In a door module known from DE 10 2008 048 236 A1, a drive unit is coupled with a carrier plate via three fastening points, wherein as acoustic decoupling means for attenuating the excitation regions with increased elasticity are provided on the carrier plate around the drive unit or around each of the fastening points of the drive unit. For this purpose, circumferential rings of wave-like shape are provided around the drive unit or around the fastening points, which in their rigidity are softer than the remaining portions of the carrier plate and hence do not transmit vibrations of the drive unit to the carrier plate, or at least in an only strongly attenuated manner.

SUMMARY

It is the object of the present invention to provide a door module which provides for an improved acoustic decoupling of the drive unit from the carrier plate for reducing the acoustic excitation of the carrier plate and the resulting structure-borne sound with a simple and inexpensive construction of the door module.

According to an exemplary embodiment of the invention the decoupling means is formed by
- at least one slot which partly separates a portion carrying the drive unit from another portion of the carrier plate and extends around the drive unit or around a fastening point of the drive unit on the carrier plate in a circumferential direction, and
- at least one web which connects the portion carrying the drive unit with the other portion of the carrier plate.

The idea underlying the invention is to acoustically interrupt the carrier plate by providing one or more slots in the carrier plate, in order to acoustically separate a portion of the carrier plate, on which the drive unit is arranged, from the remaining portions of the carrier plate. The slot either can surround the drive unit as a whole or each fastening point of the drive unit individually, so that via the slot the drive unit is acoustically separated from the actual carrier plate.

The at least one slot, which partly opens and hence acoustically interrupts the carrier plate, does not completely extend around the drive unit or around a fastening point of the drive unit, but is interrupted by a web which connects the portion carrying the drive unit with the actual carrier plate. Via the carrying portion and the connecting web, the drive unit is held and connected with the remaining portions of the carrier plate, and forces are suitably introduced into the carrier plate and the vehicle door.

In principle, one or more slots and a corresponding number of webs can be provided. The slots serve for acoustically interrupting the carrier plate, while the webs serve for the connection and mechanical coupling of the drive unit with the carrier plate.

To achieve an efficient acoustic decoupling of the drive unit from the actual carrier plate, the width of a web measured in circumferential direction advantageously is smaller than the length of a slot measured in circumferential direction. Advantageously, the width of the webs on the whole should be small as compared to the length of the slots, so that the drive unit is largely decoupled from the actual carrier plate by circumferential slots.

The slots and webs arranged on the carrier plate together form a decoupling ring circumferentially surrounding the drive unit or a fastening point for acoustically decoupling the drive unit. This decoupling ring extends around the drive unit or a fastening point of the drive unit and hence circumferentially encloses the same. In this way, the drive unit is acoustically decoupled from the actual carrier plate, the propagation of the structure-borne sound from a portion holding the drive unit towards the remaining portions of the carrier plate is limited, and the acoustic excitation of the carrier plate and further functional components mounted thereon is inhibited as far as possible. The portion of the carrier plate carrying the drive unit advantageously is small in its surface area as compared to the surface area of the remaining portions of the carrier plate, so that in operation of the drive unit most of the parts of the carrier plate are not excited to vibrate or only in an attenuated way.

The decoupling ring can have a circular shape, but for example can also be formed oval or rectangular and extend around the drive unit or a fastening point of the drive unit. The term "ring" here is used as synonym for a circumferential arrangement which can have an arbitrary, also geometrically irregular shape and in particular can deviate from a circular shape.

By selectively mounting the slots and by optimizing the slots in terms of their orientation and length, the resonance behavior of the carrier plate as a whole and of such portions which particularly are exposed to an acoustic excitation can also be influenced.

It can also be conceivable and advantageous to provide two or more decoupling rings, which each are formed by at least one slot and at least one web on the carrier plate and extend around the drive unit or a fastening point of the drive unit. The plurality of decoupling rings are offset radially (transversely to the circumferential direction) to each other such that an inner decoupling ring is followed by a decoupling ring located further to the outside and this decoupling ring possibly is followed by further decoupling rings. The decoupling rings hence are arranged one inside the other, possibly concentrically to each other.

If a plurality of decoupling rings, for example two decoupling rings, are provided, an inner decoupling ring can be arranged relative to an outer decoupling ring such that the webs of the inner decoupling ring are offset in circumferential direction relative to the webs of the outer decoupling ring. The idea here is to reduce a propagation of structure-borne sound by transmitting vibrations from an inner portion of the carrier plate carrying the drive unit towards outer portions of the carrier plate via the webs due to the arrangement and orientation of different decoupling rings relative to each other, in that as seen from the inside to the outside a web is followed by a slot, and the webs of the inner decoupling ring and the outer decoupling ring are not arranged at the same point as seen in circumferential direction. The sound waves transmitted via a web of an inner decoupling ring hence impinge on a slot of an outer decoupling ring in direction of propagation and are reflected by the same, so that a transmission of vibrations from the inner portion carrying the drive unit towards outer portions of the carrier plate is not possible or only to a very limited extent.

It is also conceivable to provide only one decoupling ring, which however includes slots which at least partly overlap in circumferential direction. The slots hence are not aligned to each other with their ends in circumferential direction, but overlap in their end portions, wherein an outer end portion of a slot is followed by an inwardly offset end portion of the next slot. For example, the slots are not arranged on a circle describing the decoupling ring, but each slot extends obliquely to the (imaginary) circle and intersects this circle. Webs are obtained between the slots, which are not directed in the preferred direction of propagation of the excited waves, but obliquely to the same.

The slots serve for the acoustic interruption of the carrier plate and at least partly open the carrier plate. Since the carrier plate of the door module frequently should also establish a moisture barrier for a moisture-tight separation of a wet space from a dry space of the vehicle door, it can be provided that for waterproofing a film covering or filling the at least one slot, a film hinge or a foam fill is arranged on the carrier plate. The film, the film hinge or the foam fill hence establish the tightness of the carrier plate for the required wet space/dry space separation, without substantially influencing the acoustic decoupling provided by the slots. Acoustically, the carrier plate hence is opened by the slots, but not for a passage of moisture.

BRIEF DESCRIPTION OF THE DRAWINGS

The idea underlying the invention will be explained in detail below with reference to the exemplary embodiments illustrated in the Figures:

FIGS. 4A, 4B show views of the carrier plate with decoupling rings arranged thereon from outside (FIG. 4A) and from inside (FIG. 4B).

FIG. 8A shows a schematic view of a slot in a carrier plate closed by a film hinge.

FIG. 8B shows a schematic view of a slot in a carrier plate closed by an adhered film.

FIGS. 8C-8E show schematic views of a slot in a carrier plate closed by different foam fills.

DETAILED DESCRIPTION

Figure 1:
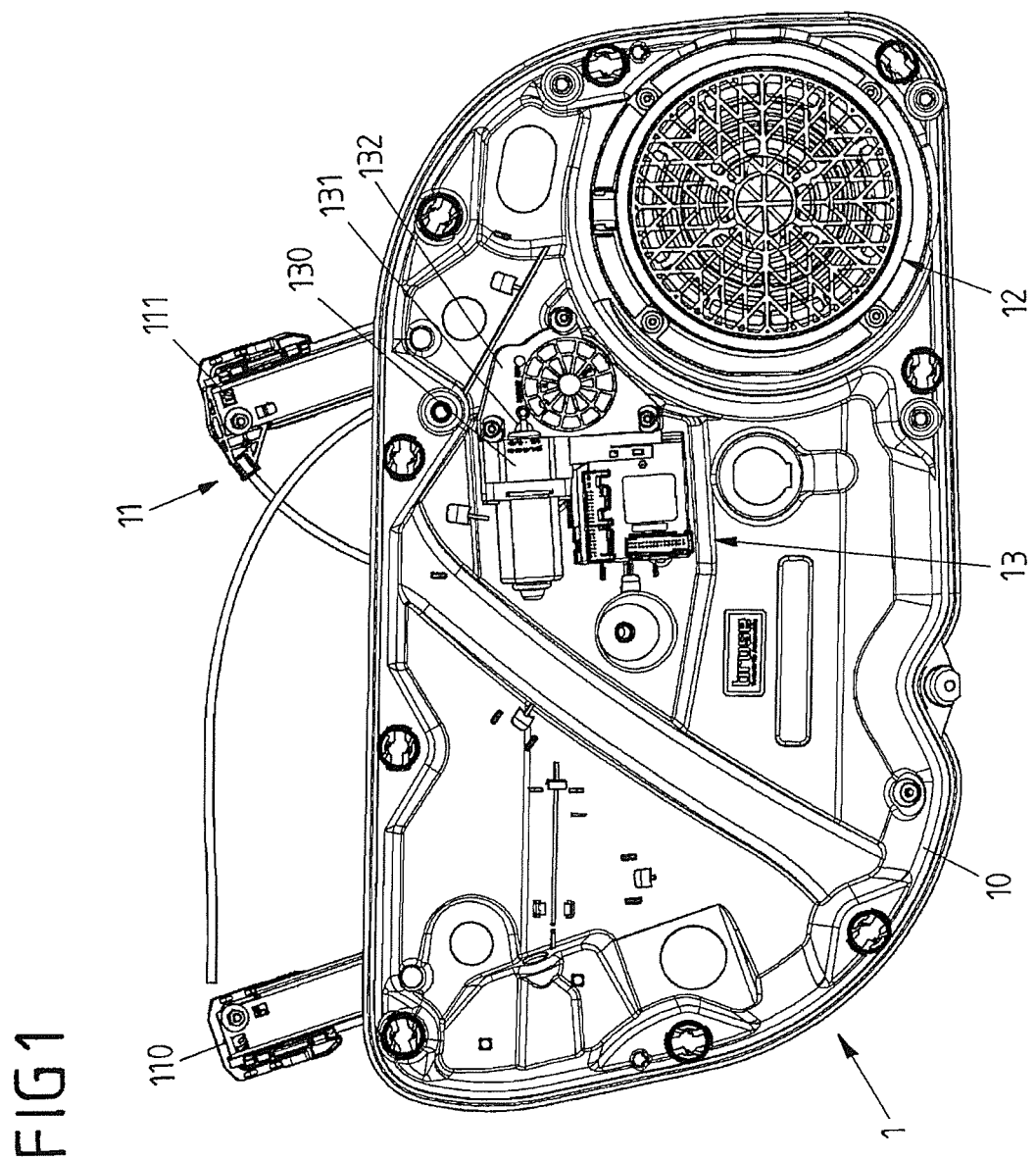
FIG. 1 shows a side view of a door module of a vehicle door.

FIG. 1 shows a side view of a door module 1 with a carrier plate 10 made of plastics, on which different functional components of a vehicle door are arranged. On the carrier plate 10 a window lifter 11 is arranged, comprising two substantially vertically extending guide rails 110, 111, a loudspeaker 12 and a drive unit 13 of the window lifter 11. In addition, for example a door lock, a side air bag or also other functional components of the vehicle door can be arranged on the carrier plate 10.

The door module 1 realizes a compact, integrated module which together with the functional components arranged thereon can be mounted as a unit on the vehicle door.

In operation of the window lifter 11 a window pane, driven by the drive unit 13, is moved along the guide rails 110, 111. For this purpose, the drive unit 13 includes a drive motor 130 in the form of an electric motor, for example a bar armature motor, which via a shaft 131 drives a transmission arranged in a transmission housing 132, which for example—in a cable window lifter—transmits an adjustment force to the window pane to be adjusted via a pulling means.

Figure 2:
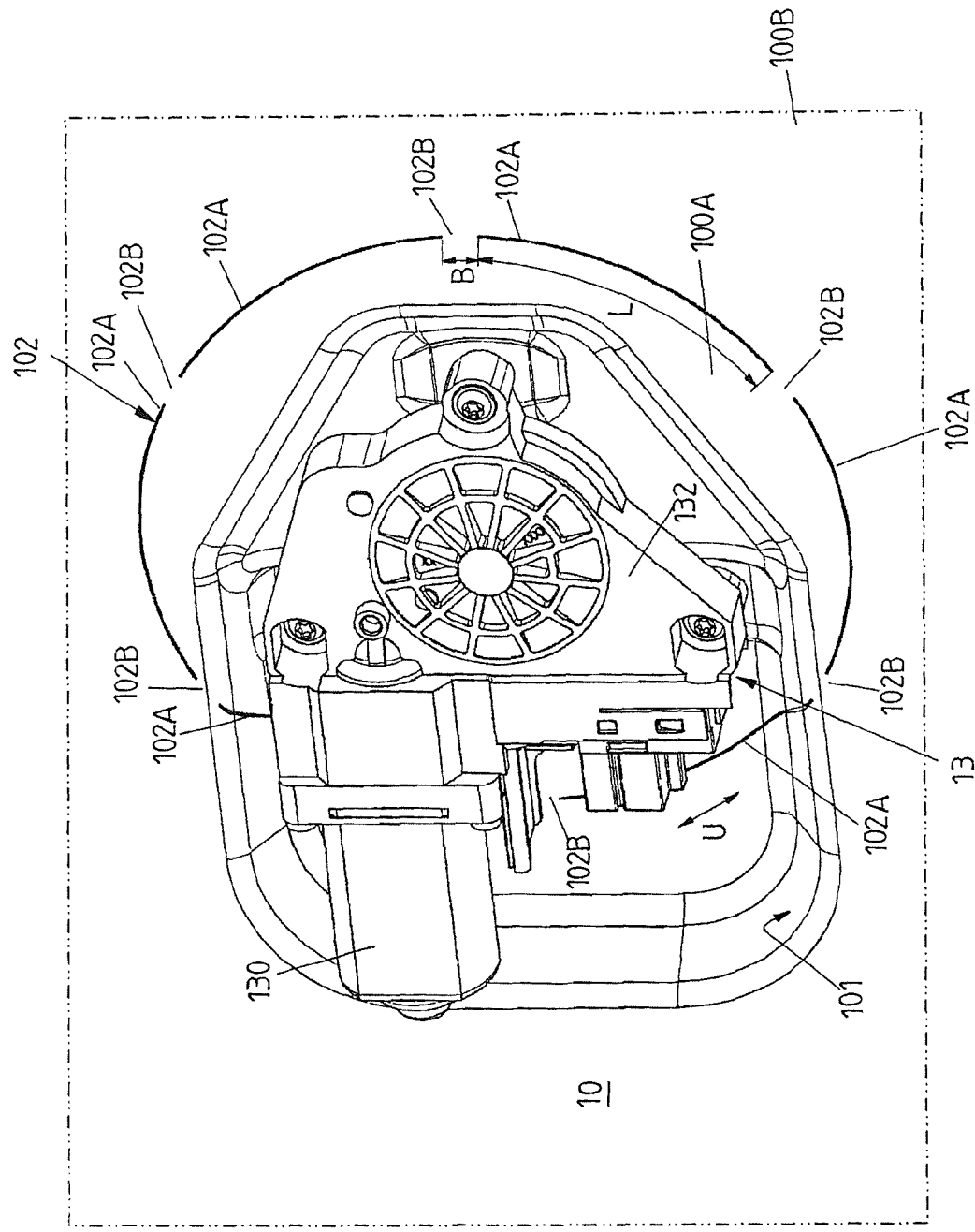
FIG. 2 shows a view of a drive unit on a carrier plate, surrounded by a decoupling ring.

As shown in FIG. 2 and FIGS. 4A, 4B, the drive unit 13 is arranged within a formation 101 of the carrier plate 10 and coupled with the carrier plate 10 via fastening points 103. Transmission parts reach through the carrier plate 10 at a through opening 104, for example for driving a cable drum arranged in the wet space of the vehicle door via the drive unit 13 arranged in the dry space of the vehicle door.

In operation of the drive unit 13, vibrations are generated as a result of the movement of components of the electric motor 130 and the driven transmission, which are also transmitted to the carrier plate 10 via the fastening points 103 for coupling the drive unit 13 with the carrier plate 10. This can lead to an excitation of vibrations also of the carrier plate 10 and to a generation of sound, which in the case of an excitation in the range of the natural resonance frequencies even is amplified and can be perceived as disturbing in the vehicle interior.

As is illustrated in FIGS. 2 to 8, the drive unit 13 as a whole or at least its fastening points 103 therefore is surrounded by one or more decoupling rings 102, 105, 106 for acoustically decoupling the drive unit 13 and for inhibiting or at least attenuating the acoustic excitation of the carrier plate 10, which decoupling rings are realized by slots 102A, 105A, 106A, which acoustically interrupt the carrier plate 10, and by webs 102B, 105B, 106B arranged between the individual slots 102A, 105A, 106A. The slots 102A, 105A, 106A partly interrupt and open the carrier plate 10, whereas the webs 102B, 105B, 106B establish the mechanical connection of a portion 100A carrying the drive unit 13 to an outer portion 100B of the carrier plate 10.

Figure 3:
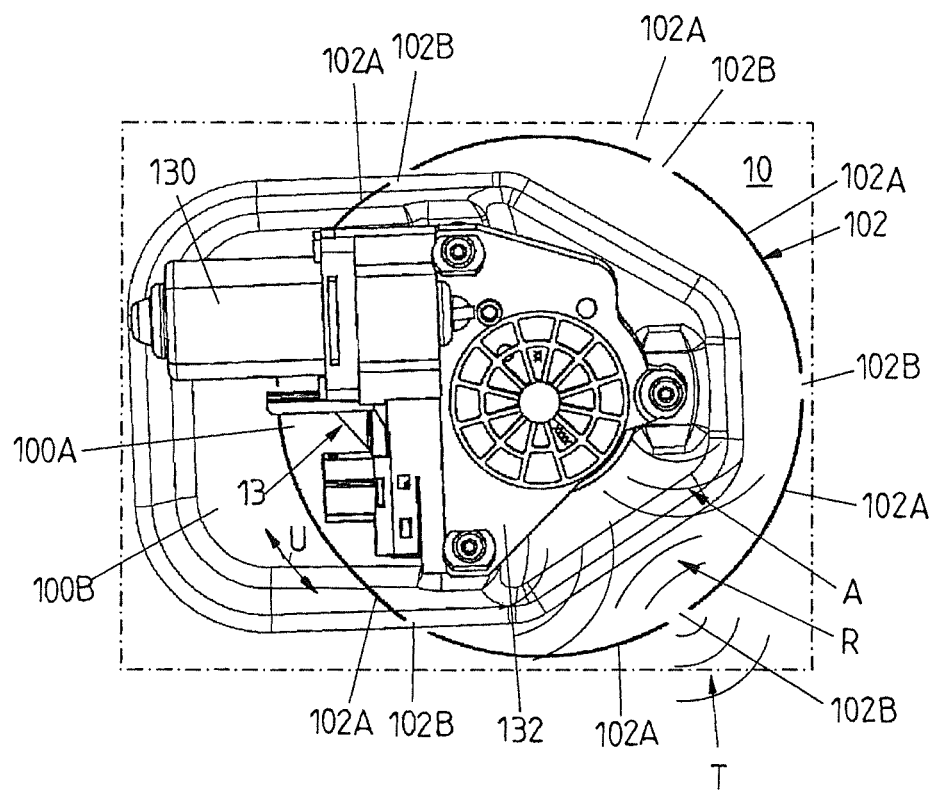
FIG. 3 shows a side view of the drive unit on the carrier plate.

As shown in FIGS. 2 to 4, a decoupling ring 102 can be provided for the acoustic decoupling, which circumferentially surrounds the drive unit 13 as a whole (along a circumferential direction U) and hence encloses the drive unit 13 by a ring formed by the slots 102A and the webs 102B. The length L of the slots 102 is measured in circumferential direction U, substantially larger than the width B of the webs 102B (see FIG. 2).

By providing the slots 102A, the carrier plate 10 partly is acoustically opened, so that a propagation of sound waves and a transmission of sound energy cannot occur over the slots 102A. As is illustrated in FIG. 3, propagating sound waves (excitation A) are reflected at the slots 102A (reflection R), so that the excited vibration energy remains in the region of the inner portion 100A carrying the drive unit 13 and only a small part is transmitted to the outside via the webs 102B (transmission T). The excitation of the actual carrier plate 10, namely the carrier plate 10 with the exception of the inner portion 100A, hence is attenuated considerably.

The excitation of the carrier plate 10 and also its resonance behavior can be adapted and adjusted as desired by the formation and orientation of the slots 102A and webs 102B.

Instead of the circular formation of the decoupling ring 102 shown in FIGS. 2 to 4, other shapes are also possible in principle, for example an oval or a rectangular formation of the decoupling ring 102.

Figure 5:
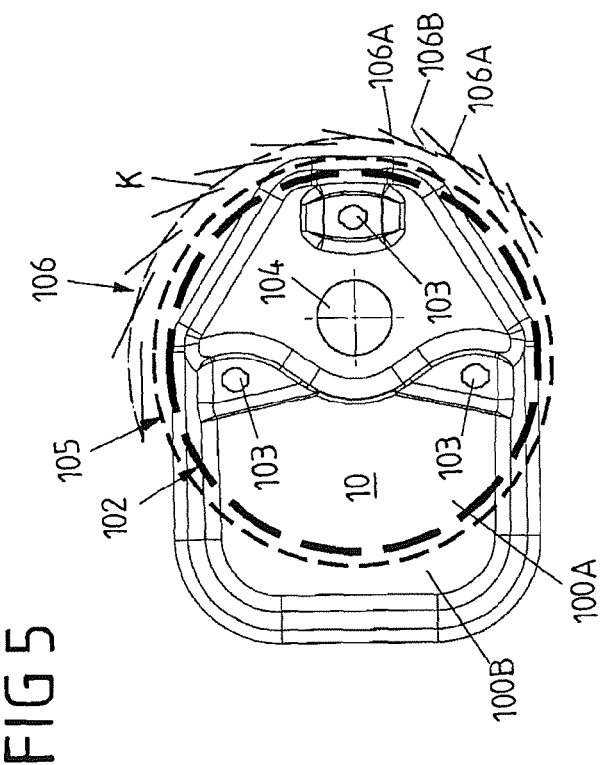
FIG. 5 shows a view of the carrier plate with different types of decoupling rings arranged thereon.
Figure 7:
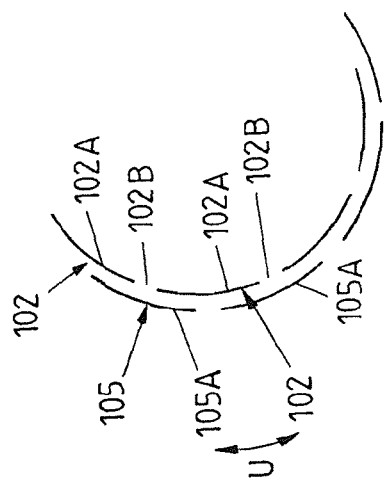
FIG. 7 shows a schematic view of the orientation of two decoupling rings relative to each other.

As is illustrated in FIG. 5, more than one decoupling ring, namely two or more decoupling rings 102, 105, 106 can also be provided, which circumferentially surround and hence enclose the drive unit 13 and are offset relative to each other in radial direction (as seen from the drive unit 13). The decoupling rings 102, 105, 106 can include differently formed slots 102A, 105A, 106A, which for example differ in their length, or also overlap each other, as illustrated by way of example with the decoupling ring 106.

A decoupling ring corresponding to the decoupling ring 106 also can be provided as a single decoupling ring. In the decoupling ring 106, slots 106A are overlappingly arranged and hence do not follow each other in series (for example on a circle describing the decoupling ring), but extend obliquely to an (imaginary) circle K and overlap each other in end portions such that an outer end portion of a slot 106A always is followed by an inner end portion of the next slot 106A. In this way, the shape of the webs 106B is adapted, which extend through between the slots 106A and hence are directed obliquely to the primary propagation directions of the sound waves proceeding from the fastening points.

It is also conceivable to form the slots 106A of the decoupling ring 106 curved and not linear, as shown in FIG. 5.

Figure 6:
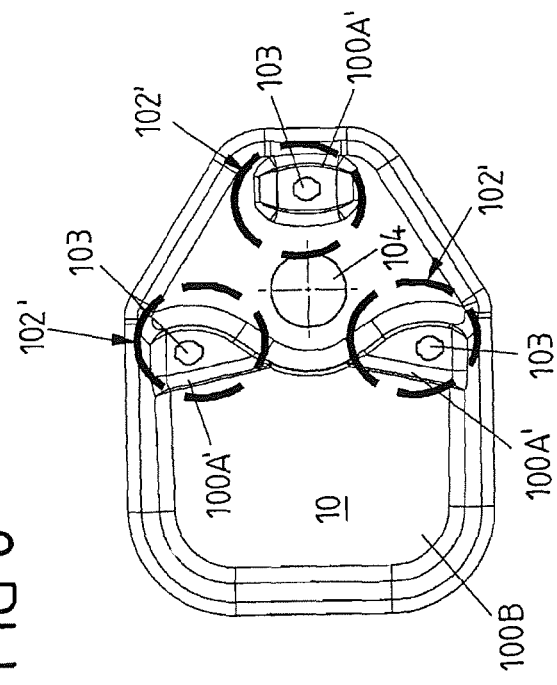
FIG. 6 shows views of the carrier plate with decoupling rings which individually surround the fastening points for connecting the drive unit.

Instead of surrounding the drive unit 13 as a whole by one or more decoupling rings 102, 105, 106, the fastening points 103 of the drive unit 13 also can each individually be surrounded by one or more decoupling rings 102, 105, 106, as is illustrated in FIG. 6.

If two or more decoupling rings 102, 105, 106 are provided, the slots 102A, 105A, 106A of the decoupling rings 102, 105, 106 can be arranged relative to each other such that they overlap in circumferential direction U. In other words, the webs 102B, 105B, 106B of the decoupling rings 102, 105, 106 do not directly follow each other as seen from the inside to the outside, but are offset relative to each other in circumferential direction U, so that sound waves excited via the drive unit 13 cannot easily propagate via the webs 102B, 105B, 106B, but after passing a web 102B impinge on a slot 105A following in radial direction (as seen from the drive unit 13) and are reflected.

Via the slots 102A, 105A, 106A, the carrier plate 10 is acoustically interrupted and hence acoustically opened. To nevertheless form the carrier plate 10 moisture-tight for forming a moisture barrier and for separating a wet space from a dry space of a vehicle door, the slots 102A, 105A, 106A can be closed in a moisture-tight manner, for example in that a film hinge 107 (FIG. 8A), a film 108, 108' (FIG. 8B) or a foam fill 109 (FIG. 8C, 8D, 8E) is provided for closing the slots 102A, 105A, 106A in a moisture-tight manner. The film hinge 107, the film 108 and the foam fill 109 merely serve as moisture barrier, but have no or a negligible influence on the acoustic decoupling effect of the slots 102A, 105A, 106A. Acoustically, the carrier plate 10 remains open at the place of the slots 102A, 105A, 106A.

When using a film hinge 107, as shown in FIG. 8A, the film hinge can be made of the same material as the carrier plate 10 and be injection-molded in the same operation.

The film according to FIG. 8B can be glued onto the carrier plate 10 in a bulging (film 108) or flat form (film 108').

The foam fills according to FIG. 8C, FIG. 8D and FIG. 8E differ by the protrusion of the foam fill 109 on one or on both sides of the carrier plate 10. In the variant according to FIG. 8C, the foam fill protrudes on both sides and hence forms a positive connection, so that the foam fill 109 no longer can slip out of the slot 102A after being introduced (e.g. after injection-molding). In the variant according to FIG. 8D, the foam fill 109 does not completely extend from one side to the other. In the variant according to FIG. 8E, the foam fill 109 slightly protrudes on the one side, but on the other side terminates with the surface of the carrier plate 10.

The idea underlying the invention is not limited to the exemplary embodiments described above, but can also be employed in principle in completely different embodiments. For example, the decoupling rings also can have a completely different shape and be made of completely different slots. A slot for example can also spirally extend around a drive unit or around a fastening point of the drive unit and hence overlap itself in circumferential direction.

The invention claimed is:

1. A door module of a vehicle door comprising:
   A carrier plate;
   a drive unit arranged on the carrier plate for driving a power-operated adjustment device of the door module; and
   a decoupler on the carrier plate for attenuating an acoustic excitation of the carrier plate in operation of the drive unit, wherein the decoupler comprises:
   at least one slot which partly separates a portion carrying the drive unit from another portion of the carrier plate and extends around the drive unit or around a fastening point of the drive unit on the carrier plate in a circumferential direction;
   and at least one web which connects the portion carrying the drive unit with the other portion of the carrier plate; and
   a film, a film hinge, or a fill comprising a material which is more malleable than a material of the carrier plate covers or fills the at least one slot in a moisture-tight manner.

2. The door module according to claim 1, wherein the slot partly opens the carrier plate.

3. The door module according to claim 1, wherein the width of the web interrupting the slot as measured in circumferential direction is smaller than the length of the slot extending along the carrier plate as measured in circumferential direction.

4. The door module according to claim 1, wherein the at least one slot and the at least one web together form a decoupling ring circumferentially surrounding the drive unit for acoustically decoupling the drive unit.

5. The door module according to claim 4, wherein the decoupling ring arranged on the carrier plate circumferentially surrounds the drive unit.

6. The door module according to claim 4, wherein the decoupling ring arranged on the carrier plate circumferentially surrounds at least one fastening point of the drive unit.

7. The door module according to claim 4, wherein two or more decoupling rings, each formed by at least one slot and at least one web, are arranged on the carrier plate and spaced from each other transverse to the circumferential direction.

8. The door module according to claim 4, wherein an inner decoupling ring and an outer decoupling ring are arranged relative to each other such that a web of the inner decoupling ring is offset to a web of the outer decoupling ring in circumferential direction.

9. The door module according to claim 4, wherein the slots of the decoupling ring at least partly overlap each other in circumferential direction.

10. The door module according to claim 1, wherein the fill comprises a foam fill.

* * * * *